United States Patent Office 2,823,205
Patented Feb. 11, 1958

2,823,205

OIL AND SPIRIT-SOLUBLE DERIVATIVES OF PHTHALOCYANINES

Harold T. Lacey, Westfield, N. J., and George R. Waitkins, Kirkwood, Mo., assignors to American Cyanamid Company, New York, N. Y., a corporation of Maine No Drawing. Application May 4, 1953
Serial No. 352,998

19 Claims. (Cl. 260—270)

This invention relates to new coloring matters of the phthalocyanine series, and more particularly to new oil-soluble and spirit-soluble phthalocyanine compounds.

Phthalocyanine pigments have many important technical advantages and are outstanding in many of their pigmentary properties, particularly their tinctorial properties and lightfastness qualities, which make them especially desirable pigments for use in paints, enamels, lacquers, printing inks, and the like. The simple pigments are quite insoluble in the organic solvents used as vehicles in inks, lacquers and oil colors as well as in many polymers widely used in the plastics industry. Dispersions of the simple phthalocyanines in these media are unsatisfactory for many purposes.

Attempts have been made in the past to prepare modified phthalocyanines which would have solubility in organic solvents or other media. Among the modifications which have been proposed is the reaction of phthalocyanine sulfonic acid derivatives with secondary amines. While the products of this reaction are somewhat soluble in solvents like alcohol, the products have little or no solubility in hydrocarbon oils or in plastics.

It has also been proposed to produce hydrocarbon-soluble phthalocyanines by the reaction of chloromethyl phthalocyanines with secondary amines. While these products have some oil solubility, they have the disadvantage of requiring the relatively expensive chloromethylation of phthalocyanines.

In accordance with the present invention, we have found that it is possible to prepare phthalocyanine derivatives which have greatly increased solubility in spirits and oils. Thus the compounds of the present invention being spirit-soluble, not only are highly useful in coloring lacquers, varnishes and similar organic solutions but since they can also be made soluble in hydrocarbon solvents they are also highly useful for coloration of oily printing inks, polymers, etc. The novel colors of the present invention are characterized by superior properties, combining the brilliance of shade and lightfastness of the phthalocyanines with solubility in spirits and hydrocarbon solvents.

The compounds of the present invention are prepared from o-carboxybenzamidomethyl substituted phthalocyanines which are described and claimed in the copending application of Harold T. Lacey, Serial No. 234,470, filed June 29, 1951, abandoned in favor of application 354,-897, now Patent 2,761,868, September 4, 1956, entitled "Sulfonated and Unsulfonated Imidomethyl, Carboxyamidomethyl and Aminomethyl Phthalocyanines," involving the introduction of o-carboxybenzamidomethyl groups into the phthalocyanine nucleus by reaction of a phthalocyanine in sulfuric acid solution with methylolphthalimide, for example, at moderately elevated temperatures. As disclosed in the Lacey application, up to eight o-carboxybenzamidomethyl groups can be introduced. The reaction first forms the phthalimidomethyl derivatives which usually are in part hydrolyzed in situ in the reaction mixture to the o-carboxybenzamidomethyl compounds. Complete hydrolysis to the o-carboxybenzamidomethyl compounds is readily achieved by further heating with concentrated sulfuric acid or by boiling with dilute alkaline solutions.

The resulting o-carboxybenzamidomethyl substituted phthalocyanines are reacted with a quaternary ammonium compound to form the novel products of the present invention. This reaction can be conveniently carried out by dissolving the o-carboxybenzamidomethyl phthalocyanine derivatives in aqueous alkali. The sodium salts so formed in solution are treated with aqueous or alcoholic solutions of the quartenary ammonium ion usually as its chloride. The product usually precipitates out unless the quaternary ammonium ion has such small aliphatic groups that the products have some water-solubility. In the latter case, precipitation is achieved by the addition of a water-miscible solvent, such as acetone, in which the product is insoluble, or by salting out. The products are isolated by filtration and washed, or washed directly by decantation and dried.

The dry products are ready for use as colorants for lacquers, varnishes and similar organic solutions as well as for printing inks, polymers, etc.

It is a surprising feature of the present invention that the novel products of the present invention have such greatly increased solubility in spirits and oils since the substituted ammonium salts of phthalocyanine sulfonic acids have no such solubilities and are limited to alcohol solubility for all practical purposes. This is borne out by the fact that the tetrasulfonic acid of a phthalocyanine when reacted with a long-chain aliphatic quaternary ammonium ion gives a product with only moderate solubility in alcohol and no solubility in hydrocarbons or oils, whereas the tetra-(o-carboxybenzamidomethyl) copper phthalocyanine of the present invention when reacted with the same quaternary ammonium ion produces a product which is highly soluble in both hydrocarbons and alcohol. The reason for the increased solubility of the products of the present invention is not known and, therefore, it is not desired to limit the invention to any particular theory of action.

The greatly increased solubility in spirits and oils of the products of the present invention, however, is a marked advantage in that it permits far greater color value to be built up by greatly increased concentration of the coloring matter as well as aiding greatly in the speed of solution or dispersion in the vehicles in which the colorants are used. In the preparation of heat-set and moisture-set printing inks, for example, the compounds of the present invention require only a simple mixing before a homogeneous ink is obtained.

It is a further advantage of the present invention that the novel products are blues of a very desirable green shade and the products are much more substantive on cotton and paper than previously available phthalocyanine coloring matters.

One of the important advantages of the present invention lies in the great flexibility of the solubility ranges obtainable by proper choice of the groups placed on the quaternary ammonium ion. This range extends from the water-soluble, slightly spirit-soluble, oil-insoluble characteristics of the tetra lower alkyl ammonium salts through all gradations up to the water-insoluble, slightly spirit-soluble, very oil-soluble properties of the compounds containing a number of large hydrocarbon groups. By proper choice of the groups on the ammonium ion, products of approximately any desired solubility relationship can be obtained.

Numerous quaternary ammonium compounds are contemplated herein for preparing the quaternary ammonium salts of o-carboxybenzamidomethyl substituted phthalocyanines of the present invention. As stated hereinbefore, the solubility characteristics of the products of the present invention can be varied over a wide range by proper choice of groups on the quaternary ammonium ion. These groups can be alkyl groups of varying length from one carbon up. They can be mixtures of such groups such as are found in some commercial surface active agents which are derived from natural oils by chemical treatment. Examples are those derived from coconut oil which are mixtures of the alkyl radicals from $C_8$ to $C_{18}$ and those from soya bean oil which are $C_{16}$ and $C_{18}$ hydrocarbon radicals, both saturated and unsaturated. Alternatively, the alkyl groups on the quaternary amine may be substituted by aryl groups, as in benzyl groups, hydroxy or alkoxy groups, as in beta-hydroxyethyl or alkoxyethyl radicals, or by long-chain amide groups. Some of the commercially available surface active agents of the quaternary ammonium type have the latter grouping in the form of gamma-aminopropyl radicals in which the amino groups are condensed with naturally-occurring long-chain fatty acid mixtures. The quaternary nitrogen may also be attached directly to aryl groups, such as phenyl, naphthyl, diphenyl, and the like, and substitution products thereof. A further type of quaternary ammonium ion which is useful herein is one in which the nitrogen is an integral part of a ring system. Examples of this type of compound are alkyl pyridinium ions and dialkyl morpholinium ions. The solubility characteristics of the final product depends on the choice of quaternary ammonium ion used. Long carbon chains, multiplicity of such long chains, and the absence of hydrophyllic groups, such as amide or hydroxy groups, will increase the solubility in hydrocarbons. The presence of such hydrophyllic groups and shorter carbon chains will tend to favor spirit-solubility. As practical examples of quaternary ammonium compounds useful in carrying out the present invention there may be mentioned, hexadecyl dimethyl benzyl ammonium chloride, stearamidopropyl dimethyl benzyl ammonium chloride, myristamidopropyl dimethyl benzyl ammonium chloride, stearamidopropyl dimethyl beta-hydroxyethyl ammonium chloride, dodecyl trimethyl ammonium chloride, octadecyl trimethyl ammonium chloride, and dodecyl pyridinium bromide.

It is a further advantage of the present invention that it is not necessary to use the pure quaternary ammonium compounds in the reaction with the o-carboxybenzamidomethyl substituted phthalocyanines to form the novel products of the present invention. Commercially available quaternary ammonium salts are highly useful in the present invention and are less costly than the pure compounds. Many of the commercially available quaternary ammonium mixtures are complicated mixtures because they are manufactured from naturally-occurring fatty oils, for example, coconut oil and soya bean oil. The use of such mixtures is contemplated herein as well as the pure compounds.

The reaction temperature is not particularly critical and a wide range of temperatures has been found to produce useful products.

The phthalocyanines which are substituted by o-carboxybenzamidomethyl groups in accordance with the procedure of the Lacey application hereinabove referred to, and which are then reacted with a quaternary ammonium ion to produce the novel products of the present invention, include the unmetallized phthalocyanine as well as the metallized pigment containing copper, cobalt, nickel, iron, zinc, tin or other metals of a coordination number of 4–6. Such carboxybenzamidomethyl substituted phthalocyanines may also be substituted by other groups inert to the treatment of the present invention. Such substituents may be halogen, sulfonic acid groups, nitro groups, amino groups, and the like. Because the number of available active positions in the phthalocyanine nucleus is limited, the presence of other substituents in the pigment reduces the number of phthalimidomethyl groups which can be introduced. The sum of the number of such groups plus the number of carboxybenzamidomethyl groups cannot exceed eight.

The novel products of the present invention have the general formula:

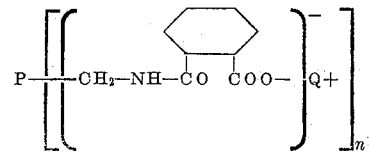

in which P represents a phthalocyanine nucleus, metallized or unmetallized, Q+ represents a quaternary ammonium ion and $n$ represents a positive integer less than 9.

The invention will be described in greater detail in conjunction with the following specific examples in which the parts are by weight unless otherwise specified.

*Example 1*

(Following the procedure of said Lacey Patent 2,761,868.)

To 140 parts of 100% sulfuric acid is added at 50–55° C., 10 parts of copper phthalocyanine, 56.6 parts of 30% oleum, 30.5 parts of phthalimide, and 11 parts of paraformaldehyde. The mixture is stirred at 70–75° C. until the reaction is substantially complete. The product is isolated by drowning the mixture and filtering the precipitate. The yield of tetraphthalimidomethyl copper phthalocyanine is excellent. By stirring the mixture at higher temperatures, sulfonic acid groups can also be introduced. By varying the usage of paraformaldehyde and phthalimide, more or less phthalimidomethyl groups are introduced. By heating the above phthalimidomethyl substituted phthalocyanine in concentrated sulfuric acid at about 100° C., any phthalimidomethyl groups which have not already been hydrolyzed and which action partially occurs in the preparation are split and the corresponding o-carboxybenzamidomethyl compound is formed.

*Example 2*

6 parts of tetra-(o-carboxybenzamidomethyl) copper phthalocyanine containing approximately an average of 0.4 sulfonic acid groups per molecule is stirred into a solution of 7 parts of sodium hydroxide in 580 parts of water until the sodium salt is formed. 8 parts of hexadecyl benzyl dimethyl ammonium chloride is dissolved in 700 parts of water, and the solution is added gradually to the solution of the sodium salt, the latter being held at 75° C. Stirring is continued until the reaction is substantially complete. The product is isolated by filtration and washing and dried in an oven. It is found to have good solubility in benzene, toluene, alcohol, and mixtures of aromatic and aliphatic hydrocarbons. It can be readily dissolved or dispersed in an ink vehicle and prints a clear blue shade of a slightly greenish tint.

*Example 3*

1 part of tetra-(o-carboxybenzamidomethyl) copper phthalocyanine containing an average of 0.4 sulfonic acid groups per molecule is dissolved in a solution of 1 part of sodium hydroxide in 120 parts of water. A solution of 2.5 parts of stearamidopropyl dimethyl benzyl ammonium chloride in 2.5 parts of isopropyl alcohol is added to the solution of the sodium salt, the latter being held at 95° C. The precipitated product is isolated by filtering and washing and is dried in an oven at 65° C. The product is insoluble in acetone, very soluble in alcohol, and readily soluble in toluene and mixed hydrocarbon solvents.

*Example 4*

To a solution of the sodium salt of tetra-(o-carboxybenzamidomethyl) copper phthalocyanine containing an average of 0.4 sulfonic acid groups per molecule as prepared in Example 3, 6 parts of myristamidopropyl dimethyl benzyl ammonium chloride in 6 parts of isopropyl alcohol is added gradually. The product which is isolated by filtration and washing has similar solubility characteristics to the product of Example 3.

Example 5

A product is prepared by the procedure of Example 3 using in place of the stearamidopropyl dimethyl benzyl ammonium chloride 3.0 parts of an acylamidobenzyl dimethyl beta-hydroxy ethyl ammonium chloride in which the acyl groups are a mixture of $C_8$ to $C_{18}$ saturated fatty acids. The product obtained is insoluble in acetone but soluble in alcohol.

Example 6

A product is prepared by the procedure of Example 3 using as the quaternary ammonium chloride, 3.5 parts of stearamidopropyl dimethyl beta-hydroxy ethyl ammonium chloride. The sticky solid isolated by decantation is insoluble in acetone but readily soluble in alcohol.

Example 7

5 parts of tetra-(o-carboxybenzamidomethyl) copper phthalocyanine containing no sulfonic acid groups is dissolved in a solution of 5 parts of sodium hydroxide in 220 parts of water. To this solution of the sodium salt, held at 60° C., is added gradually 14 parts of dodecyl trimethyl ammonium chloride in 14 parts of isopropyl alcohol and 56 parts of water. The precipitated product is isolated by filtering and drying. It is a waxy, deep blue solid which is practically insoluble in benzene but readily soluble in alcohol.

Example 8

20 parts of tetra-(o-carboxybenzamidomethyl) copper phthalocyanine is dissolved in a solution of 20 parts of sodium hydroxide in 1880 parts of water. To this solution of the sodium salt, held at 45° C., is added 32 parts of a dimethyl dialkyl ammonium chloride in which the alkyl groups are principally hexadecyl, octadecyl, octadecenyl, and octadecadienyl groups in 340 parts of water. The dark blue precipitate is isolated by filtering and washing and dried in an oven. It is readily soluble in alcohol and to a lesser degree in diethylene glycol. Its solubility in high-boiling petroleum thinners is somewhat poorer. A boiling solution in alcohol into which is dipped a piece of multifiber cloth, dyes cotton a brilliant blue, and dyes nylon, viscose, and silk a pale blue, while acetate and wool are undyed. This dyeing is not obtained when the cloth is first dipped in the quaternary ammonium chloride solution and then into the alkaline solution of the substituted copper phthalocyanine. The product is dispersed very readily in heat-set ink vehicles and gives slightly greenish-blue prints on paper.

Example 9

To a solution of the sodium salt of tetra-(o-carboxybenzamidomethyl) copper phthalocyanine, prepared as in Example 7, is added in similar manner a solution of 20 parts of octadecyl trimethyl ammonium chloride in 20 parts of isopropyl alcohol and 70 parts of water. The gelatinous precipitate is isolated by filtration and on drying in an oven becomes a dark blue solid, which is practically insoluble in benzene but readily soluble in alcohol.

Example 10

The procedure of Example 7 is followed, using 2.0 parts of a dimethyl dialkyl ammonium chloride in which the alkyl groups range from octyl to octadecyl as a naturally occurring mixture. The precipitate is isolated by filtration and is found to be a sticky, dark blue solid with good solubility in alcohol, toluene, and mixed hydrocarbons.

Example 11

The procedure in Example 7 is followed using 3.0 parts of an alkyl trimethyl ammonium chloride in which the alkyl group is a mixture consisting principally of saturated and unsaturated $C_{16}$ and $C_{18}$ hydrocarbons. The blue powder which is obtained by filtering, washing, and drying shows good solubility in alcohol and benzene.

Example 12

20 parts of tetra-(o-carboxybenzamidomethyl) copper phthalocyanine are dissolved in a solution of 20 parts of sodium hydroxide in 1580 parts of water. To this solution, held at 65° C., is added a solution of 8 parts of hexadecyl benzyl dimethyl ammonium chloride in water. The product which is isolated by filtering and washing is a friable, loose solid. It is soluble in alcohol and to a lesser degree in diethylene glycol. The solubility was somewhat poorer in high-boiling petroleum thinners, but it is very readily dispersed in such a vehicle containing a metallic rosinate binder to form a heat-set ink which prints paper a greenish-blue.

Example 13

120 parts of tetra-(o-carboxybenzamidomethyl) copper phthalocyanine, containing about 0.4 sulfonic acid groups per molecule, is dissolved in a solution of 120 parts of sodium hydroxide in 8480 parts of water. This solution is held at 45° C. while a solution of 192 parts of a dimethyl dialkyl ammonium chloride, in which the alkyl groups are a mixture of 30% hexadecyl and 70% octadecyl in 3200 parts of water, is added gradually. The precipitated product is washed by decantation with cold water and dried at 65° C. The product is soluble in mixed hexanes and other aliphatic hydrocarbons, alcohol, and toluene.

Example 14

12 parts of tetra-(o-carboxybenzamidomethyl) copper phthalocyanine is dissolved in a solution of 12 parts of sodium hydroxide in 150 parts of water. This solution is held at 35° C. while a solution of 16.5 parts of an alkyl trimethyl ammonium chloride, in which the alkyl group is a mixture of saturated and unsaturated $C_{16}$ and $C_{18}$ hydrocarbons, in 16.5 parts of water, is added gradually. The precipitated blue solid is isolated by filtration and washing and dried. It shows good solubility in both toluene and alcohol.

Example 15

12 parts of tetra-(o-carboxybenzamidomethyl) copper phthalocyanine, containing an average of 1.5 sulfonic acid groups per mlecule, is dissolved in a solution of 12 parts of sodium hydroxide in 150 parts of water. This solution is held at 35° C. while 19.2 parts of an aqueous solution of a dimethyl dialkyl ammonium chloride, in which the alkyl groups are a naturally occurring mixture ranging from $C_8$ to $C_{18}$ hydrocarbon radicals, is added gradually. The precipitated product, after isolation and drying, is soluble in alcohol, toluene, and aliphatic hydrocarbons.

Example 16

20 parts of tetra-(o-carboxybenzamidomethyl) cobalt phthalocyanine is dissolved in a solution of 20 parts of sodium hydroxide in 1580 parts of water. To this solution, held at 60–65° C., is added gradually with stirring 30.0 parts of a solution of hexadecyl benzyl dimethyl ammonium chloride in water. The product isolated by filtration and washing is soluble in alcohol and slightly soluble in hydrocarbons. Its shade is greener than that of the product of Example 10.

Similarly, the tetra-(o-carboxybenzamidomethyl) nickel phthalocyanine can be treated to give a product of similar properties but of a still greener shade.

Example 17

12 parts of monocarboxybenzamidomethyl copper phthalocyanine disulfonic acid is dissolved in a solution of 10 parts of sodium hydroxide in 150 parts of water. This solution is held at 35° C. while 36.0 parts of an aqueous solution of a dimethyl dialkyl ammonium chloride in which the alkyl groups are a mixture of $C_8$ to $C_{18}$ hydrocarbon radicals, is added gradually. The precipitated product, isolated by filtration, is soluble in alcohol and slightly soluble in toluene.

*Example 18*

20 parts of tetra-(o-carboxybenzamidomethyl) unmetallized phthalocyanine is dissolved in a solution of 20 parts of sodium hydroxide in 1580 parts of water. To this solution, held at 60° C., is added gradually 30.0 parts of a solution of hexadecyl benzyl dimethyl ammonium chloride in water. The product isolated by filtration and washing is soluble in alcohol and slightly soluble in hydrocarbons.

*Example 19*

10 parts of octa-(o-carboxybenzamidomethyl) copper phthalocyanine is dissolved in a solution of 20 parts of sodium hydroxide in 1580 parts of water. A solution of stearamidopropyl benzyl ammonium dimethyl chloride (6 parts) in an equal weight of isopropyl alcohol is added gradually to the solution of the sodium salt held at 60° C. The precipitated product is filtered, washed, and dried. It is soluble in alcohol, toluene, and aliphatic hydrocarbon solvents.

*Example 20*

20 parts of tetra-(o-carboxybenzamidomethyl) copper tetrachlorophthalocyanine is dissolved in a solution of 20 parts of sodium hydroxide in 1580 parts of water. This solution is held at 60° C. while a solution of 80 parts of octadecyl trimethyl ammonium chloride in 80 parts of water is added gradually. The product is isolated by filtration and found to be soluble in alcohol to give solutions much greener than those obtained from Example 14.

*Example 21*

Dodecyl pyridinium bromide is prepared by heating 25 parts of dodecyl bromide in 29 parts of pyridine until the reaction is complete and then evaporating the excess pyridine to give a soft waxy solid. A solution of 1.5 parts of this product in 30 parts of water is added to 1.5 parts of tetra-(o-carboxybenzamidomethyl) copper phthalocyanine in 75 parts of water. The gummy blue precipitate is washed by decantation and dried. It is soluble in alcohol and diethylene glycol, but insoluble in toluene and hexane.

We claim:

1. Coloring matters of the phthalocyanine series being the salt formed from an ion selected from the group consisting of the anions of unmetallized and metallized phthalocyanines having one atom of a metal having a coordination number of 4 to 6 in the center of the molecule and, as substituents, a total of not exceeding 8 from the group consisting of halogen groups, sulfonic acid groups, and orthocarboxybenzamidomethyl groups, at least one such orthocarboxybenzamidomethyl group being present, and a quaternary ammonium ion selected from the group consisting of alkyl pyridinium ions, dialkyl morpholinium ions and quaternary nitrogen ions in which the four substituents are selected from the group consisting of phenyl, naphthyl, diphenyl, alkyl groups having not more than 18 carbon atoms, unsaturated hydrocarbon groups, acylamidoalkyl groups, aralkyl, alkaryl and hydroxy alkyl.

2. Coloring matters according to claim 1 in which the phthalocyanine is metallized.

3. Coloring matters according to claim 2 in which the metals have atomic numbers of 26 to 30.

4. Coloring matters according to claim 3 in which the metal is copper.

5. Coloring matters according to claim 1 in which at least one of the substituents on the phthalocyanine is a sulfonic acid group.

6. Coloring matters according to claim 1 in which at least one of the substituents on the phthalocyanine is a chlorine atom.

7. Coloring matters according to claim 1 in which the quaternary ammonium ion is a tetraalkyl ammonium ion in which each alkyl group has less than 21 carbon atoms.

8. Coloring matters according to claim 1 in which the quaternary ammonium ion is an acylamidoalkyl trialkyl ammonium ion, in which each alkyl group has less than 21 carbon atoms.

9. Coloring matters according to claim 1 in which the quaternary ammonium ion is stearamidopropyl benzyl dimethyl ammonium.

10. Coloring matters according to claim 7 in which at least one of the alkyl groups is a long-chain radical.

11. Coloring matters according to claim 10 in which the long chain alkyl radical is a hexadecyl radical.

12. Coloring matters according to claim 1 in which the quaternary ammonium ion is derived from mixtures of alkyl groups obtained by reduction of coconut oil fatty acids.

13. The dialkyl dimethyl ammonium salt of tetra-(o-carboxybenzamidomethyl) copper phthalocyanine in which the alkyl groups are a mixture of the approximate composition of 70% octadecyl and 30% hexadecyl.

14. The dialkyl dimethyl ammonium salt of tetra-(o-carboxybenzamidomethyl) copper phthalocyanine about 0.4 sulfonic acid in which the alkyl groups are a mixture of the approximate composition of 70% octadecyl and 30% hexadecyl.

15. The dodecyl pyridinium salt of tetra-(o-carboxybenzamidomethyl) copper phthalocyanine.

16. The acylamidopropyl beta hydroxyethyl dimethyl ammonium salt of tetra-(o-carboxybenzamidomethyl) copper phthalocyanine in which the acyl groups are a mixture of the approximate composition of 8% octanoyl, 9% decanoyl, 47% dodecanoyl, 18% tetradecanoyl, 8% hexadecanoyl, and 10% octadecanoyl.

17. The hexadecyl benzyl dimethyl ammonium salt of tetra-(o-carboxybenzamidomethyl) copper phthalocyanine.

18. The process of preparing coloring matters of the phthalocyanine series which comprises reacting a phthalocyanine selected from the group consisting of unmetallized and metallized phthalocyanines having one atom of a metal having a coordination number of 4 to 6 in the center of the molecule and, as substituents, a total of not exceeding 8 from the group consisting of halogen groups, sulfonic acid groups, and orthocarboxybenzamidomethyl groups, at least one such orthocarboxybenzamidomethyl group being present, with a quaternary ammonium compound selected from the group consisting of water-soluble quaternary ammonium compounds which in solution give alkyl pyridinium ions, dialkyl morpholinium ions, and quaternary nitrogen ions in which the four substituents are selected from the group consisting of phenyl, naphthyl, diphenyl, alkyl having not more than 18 carbon atoms, unsaturated hydrocarbon, acylamidoalkyl, aralkyl, alkaryl, and hydroxy alkyl.

19. The process of claim 18 in which the phthalocyanine is copper phthalocyanine.

References Cited in the file of this patent

UNITED STATES PATENTS

| | | |
|---|---|---|
| 2,535,987 | Randall et al. | Dec. 26, 1950 |
| 2,542,328 | Haddock et al. | Feb. 20, 1951 |
| 2,547,972 | Randall et al. | Apr. 10, 1951 |

FOREIGN PATENTS

| | | |
|---|---|---|
| 852,588 | Germany | Oct. 16, 1952 |